INVENTORS
ROBERT B. HORSFALL
WILLIAM A. FARRAND
WARNER D. WILLIAMS
BY Robert D Rogers
ATTORNEY United States Patent Office 3,516,081
Patented June 2, 1970

3,516,081
FLUID BEARING PADS FOR SUPPORTING TRANSDUCERS
Robert B. Horsfall, Placentia, William A. Farrand, Fullerton, and Warner D. Williams, Buena Park, Calif., assignors to North American Rockwell Corporation, a corporation of Delaware
Continuation of application Ser. No. 606,204, Dec. 30, 1966. This application July 31, 1969, Ser. No. 847,824
Int. Cl. G11b 5/60, 21/20
U.S. Cl. 340—174.1                              2 Claims

ABSTRACT OF THE DISCLOSURE

A plurality of interconnected hydrodynamic bearing pads to which transducers are mounted. The pads form bearings for maintaining the transducers at a required spacing from a moving surface and include means for permitting self-alignment of the pads with respect to the surface.

BACKGROUND OF THE INVENTION

This patent application is a continuation of "Fluid Bearing Pads for Supporting Transducers," Ser. No. 606,204 filed Dec. 30, 1966, now abandoned.

(1) Field of the invention

The invention relates to a plurality of interconnected hydrodynamic bearing pads for supporting transducers at a proper gap with respect to a moving surface.

(2) Description of prior art

Presently, transducer support members comprise rigid supports or unitary surface areas configured to contact the moving surface or to form autolubricated (hydrodynamic) or hydrostatic bearings therewith. Such bearings provide a lifting action to maintain a small but finite gap between the transducers and the moving surface to avoid mechanical contact and resultant abrasive wear. The support members are forced toward the surface by suitable means to counteract the bearing lift and in combination define the required bearing gap. Tapes, cylinders and disks are currently used for the moving surfaces.

In general, it is necessary to apply a comparatively large load per unit area of bearing surface to keep the bearing gap as small as required. As a result, heavy and rigid structural supports are required for both the recording surface and the loading members of the transducer supports. If, for specific design reasons, it is desired to reduce the mass and therefore the rigidity of either member, such large loads may cause undesirable transducer deflections. The specific example used in describing the invention herein, involves thin tensioned disks as the surfaces. While such disks maintain flatness in the same way that a "drum-head" does, they may be locally deflected under load, and the magnitude of such deflections must be minimized.

Furthermore, it is desirable to provide a single member capable of carrying a plurality of transducers at relatively large separations and to provide a bearing configuration which can generate adequate torque moments to maintain alignment relative to the surface in the presence of moderate surface deflections.

SUMMARY OF THE INVENTION

Briefly, the invention comprises a plurality of rigidly interconnected contoured pads for supporting transducers. Hydrodynamic bearings are developed between the pads and a recording surface (herein described as a disk) for maintaining the required operating gap between transducers and the recording surface. At the edges of the pads facing the motion of the disk surface, a portion is removed to form at least one surface area of increased gap which compresses the fluid under the remaining pad area to form the bearing. Instead of a relatively large force applied by the entire surface of a transducer support, a relatively reduced force is applied by the plurality of pads. If the recording surface is flat as in a disk, these pads may be considered as coplanar. If the surface were to a cylinder, the pad surface would be cylindrical. The pads must be aligned relative to the recording surface and may not be coplanar for every application.

The interconnected pads include surface areas to which transducers can be mounted and provide for attachment of loading members which interconnect the pad with a positioning arm. The loading members exert a force on the pads to urge the pads toward the disk surface. The hydrodynamic bearing forces the pads away from the disk surface so that when a balance between the forces results, the transducers are maintained at the required operating gap. A hydrodynamic bearing has a very high stiffness, that is, the gap changes only slightly for a relatively large change in load. By making the equivalent spring rate of the loading members much lower, that is, by making them capable of deflecting a much greater distance for a given change in load, the force balance results in an almost constant bearing gap. The constant gap is maintained even in the presence of surface deflections which deflect the loading members substantially.

In a preferred embodiment of the present invention, a tri-pad configuration is used with a slope or ramp at the leading edge of each pad to compress the gas which is used as the hydrodynamic fluid. The force which would have been applied by gas pressure buildup under a support of similar size having unitary surface is thereby reduced.

The interconnection of the tri-pad support member and the loading members should preferably provide constraint of three degrees of freedom, those of translation parallel to the recording surface and of rotation about an axis at right angles to the recording surface, while providing relative freedom for self-alignment about the other two axes of rotation. The third degree of translatory freedom is the one which is constrained by the force balance between the gas bearing and the loading member. These requirements are exemplified herein by an embodiment comprising mechanical springs and bearings. Other embodiments are also within the scope of the invention.

It is, therefore, an object of the invention to provide a transducer support having a plurality of gas bearing surfaces for reducing the load applied to the recording surface when the support is properly positioned with respect to the recording surface.

It is still a further object of this invention to provide a transducer support member which reduces the load applied to a recording surface by a fluid bearing support means.

It is a still further object of this invention to provide a plurality of members which form gas bearings to support transducer support member which reduces the load applied to a recording surface by a fluid bearing support means.

These and other objects of this invention will become more apparent in connection with the following drawings of which,

DESCRIPTION OF THE PREFERRED EMBODIMENTS

Figure 1:
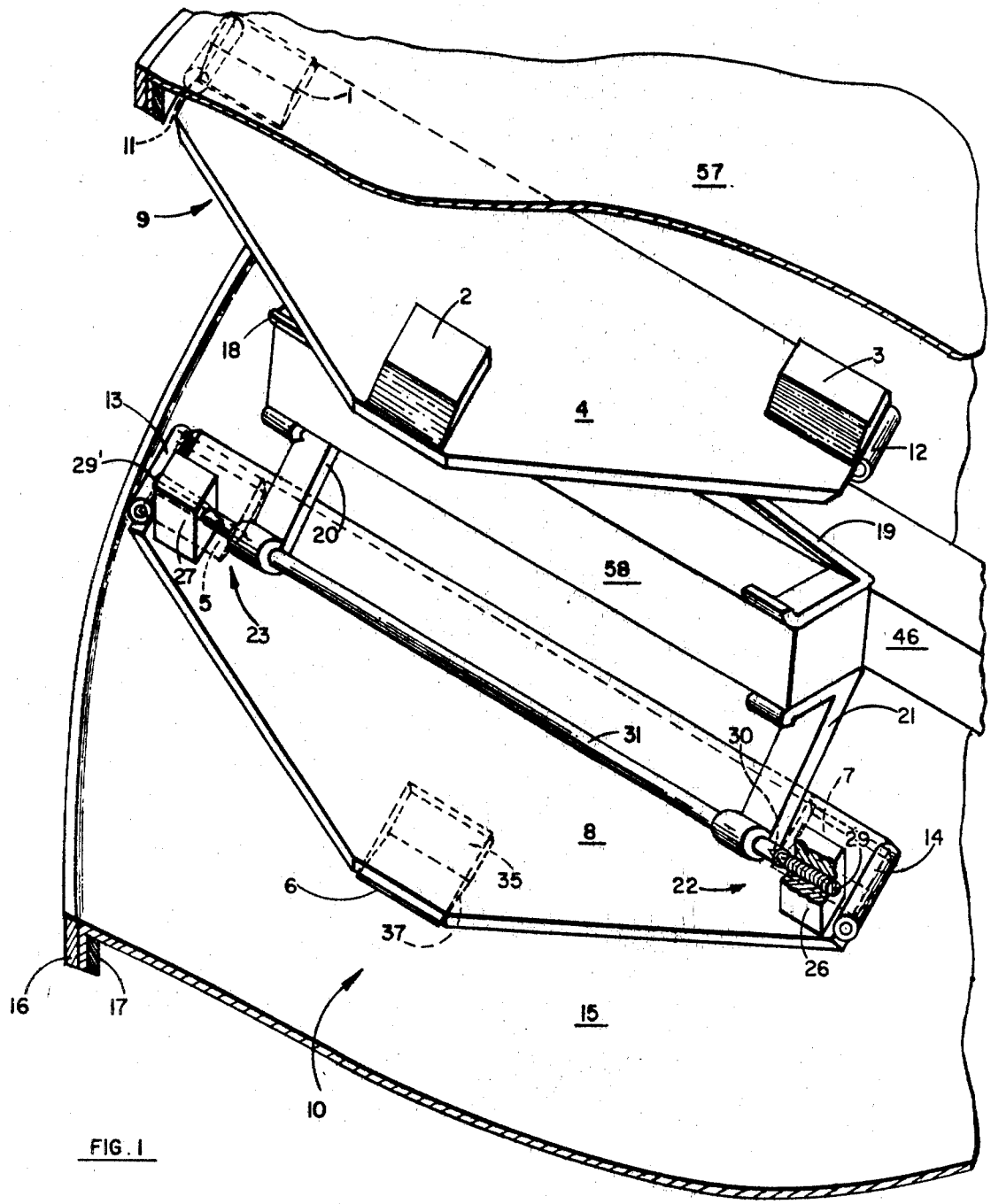
FIG. 1 contains a representation of a dual transducer support having a tri-pad gas bearing configuration.

Referring now to FIG. 1, wherein gas bearing pads 1, 2 and 3 are shown rigidly interconnected by base member 4 and gas bearing pads 5, 6 and 7 are shown rigidly interconnected by base member 8. The interconnected pads and the supporting structure comprise dual transducer supports 9 and 10. The base members are triangular in configuration but include surface areas on each side to which transducers 11, 12, 13 and 14 are mounted. The transducers may be affixed to the surface by an adhesive or other means well known in the art and are connected by electrical conductors to the processing system using the transducers.

The pads may be formed by etching, milling, lapping, etc. portions from the base member. In other processes the pads could be formed separately and affixed to the base member by adhesive or other means. The pads may be comprised of various materials such as beryllium, anodized aluminum and other materials which have dimensional stability and which are hard enough to be accurately finished during, for example, a lapping operation.

Support 10 is shown in position over annular tensioned disk 15. The disk is secured and held under tension by loop means 16 and 17. The material comprising the disk is relatively thin and, as a result, large forces applied by the transducer supports may cause it to deform. The disk includes a magnetic coating which responds to magnetic fields to record a magnetic impression or stimulates the transducer to detect a previously recorded impression. The magnetic impressions are written and/or read as binary digits comprising logical ones or zeros depending on the magnetization of the recorded area. Deformation under load could affect the reliability of the recording and reproducing process.

In practice, a similar disk is positioned over support 9 and maintained relatively parallel to disk 15. A portion of disk 57 is visible although most of it has been cut away in order to illustrate more clearly the position of the supports. By "stacking" a plurality of disks, and using dual supports as shown in FIG. 1, one positioning arm such as arm 46 can provide service to surfaces of two disks. The bottom surface of the hoop for disk 57 may rest on top of the top area of the hoop for disk 15 to form a closed area.

The supports are connected to positioning arm 46 which may either be movable in a radial direction or may be stationary. The arm, which may be comprised of a light weight, corrosive resistant, dimensionally stable material such as beryllium, anodized aluminum or the like, includes mounting area 58 to which spring tensioned members 18 and 19 for support 9 are attached. Spring tensioned members 20 and 21 interconnect support 10 with the arm. The spring members provide a load to the supports for forcing the supports towards the recording surface. The spring members are under tension when the system is in operation, that is, when the gas bearing under the pads is formed. The opposing force of the gas bearing tends to compress the spring and maintain it under tension. The spring members, which may be comprised of a metal, may be attached to the arms by adhesives, rivets or other means well known in the art.

The other terminations of the spring members form cone pivot alignment bearing means 22 and 23 for support 10. Support 9 has a similar bearing, although it is not visible in FIG. 1. Pivot housing 26 is shown partially cut away to more clearly show bearing 22. Only the head of the cone pivot 29 is visible in FIG. 1. Housing 26 and 27 include threaded and centrally located channels. Pivot member 29 is threaded for mating with the threaded channel of housing 26 and includes cone tip 30.

The ends of the spring means are circular and rigidly grip rod 31. Rod 31 includes inverted cones at each termination for mating with the cones of the pivot members. The inverted cone portion mates with cone tip 30 to form a bearing which permits rotational movement of the support about the longitudinal axis of the rod. The spring and rod members are relatively fixed with respect to the arm and the support is rotatable about the rod axis. The springs may deflect together or independently and may twist if one is deflected farther than the other. As a result, if the disk surface includes a depression or otherwise deviates from an ideally planar surface over an area large compared to the support member, the support aligns itself with respect to the deviation. In that manner the bearing gap remains relatively fixed during operation of the system.

For clarity of illustration, FIG. 1 shows the spring arms 20 and 21 in a position such that the support member is ahead of the arm 46 relative to disk rotation. In actual practice it is preferable to use trailing arms so that the pad units follow the support arm. Thus, in this embodiment, the tri-pad unit is in a canard configuration relative to the disk movement. The transducers shown in FIG. 1 are spaced by the length of the pad in such a way that both are simultaneously aligned with record tracks on the disk surface. In the case of a main data storage application where the arm 46 is movable, additional tracks are available at successive radial positions on the disk surface. Whether or not the entire surface is filled with recording tracks depends on the application.

Figure 2:
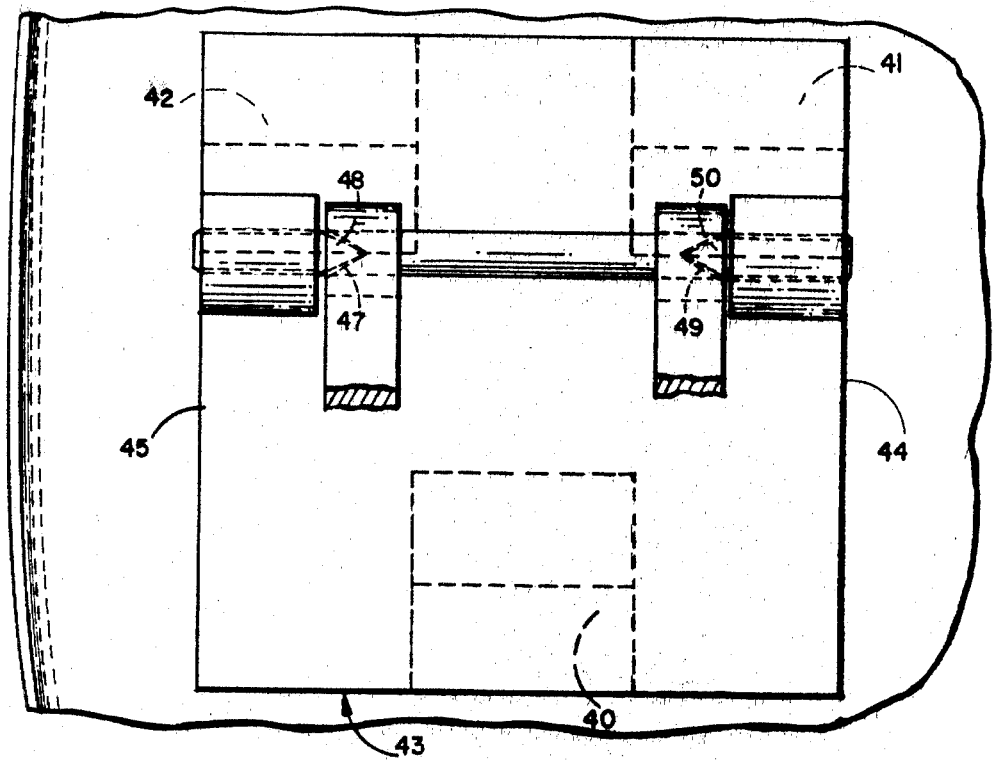
FIG. 2 contains a representation of a second embodiment of a transducer support having a relatively square configuration.
Figure 3:
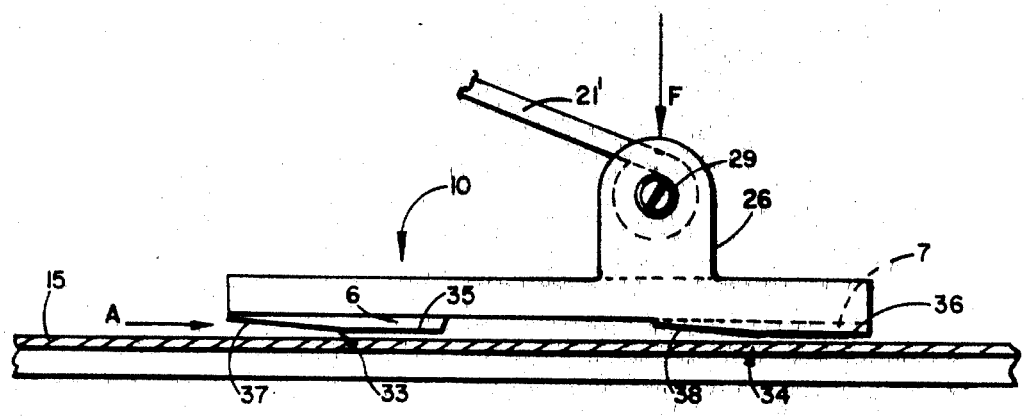
FIG. 3 contains a partial section-partial elevation view of the FIG. 1 embodiment, more clearly illustrating the surface comprising the gas bearing pads.

Referring now to FIG. 3, wherein a side view of support 10 illustrated in FIG. 1 is shown excluding transducers. The relative location of the pivot axis and the pads is more clearly displayed. The support is capable of rotational movement with respect to spring 21'. Spring 21' is shown in a trailing position as contrasted with the leading arm of FIG. 1. The gap and ramp angle are shown exaggerated in FIG. 2 for clarity in understanding. A typical gas bearing gap is 0.0001 inch. An exemplary pad may be approximately $3/16$ of an inch in length.

Bearings 33 and 34 are formed under each pad so that the required operation gap between the transducers shown in FIG. 1 and the magnetic material of the disk is established. Each pad is divided into two areas. One area is flat and coplanar with the flat areas of the other pads. A portion of the pad area is modified to increase the bearing gap. As shown in FIGS. 1 and 2, flat areas 35 and 36 comprise about one-half the pad areas. Ramp or sloping areas 37 and 38 comprise the other areas. The modification shown is in the form of a ramp taper of the front half of the pad area whose magnitude results in the front edge of the pad being approximately twice as far from the disk surface as the flat area under stable operating conditions.

In operation, force F is applied to support 10 by springs 20 and 21. When the disk rotates, gas flow such as air, A, is directed under the support. The air is compressed by means of the ramp areas of the pads and directed after compression under the flat area. The resultant gas pressure acting over the pad areas provides a force which counteracts the applied force F. Gas pressure builds up from the front edge of the pad under dynamic conditions and falls off only near the trailing edge. Thus the major bearing support occurs on the flat area of the pads.

When the resultant gas bearing force balances the applied spring force, the transducers are maintained at the necessary operating gap with respect to the disk surface. Because of the previously mentioned difference in stiffness of the spring and the gas bearing and the inherent damping properties of the gas film, the gap remains satisfactorily stable in height. The exact size and configuration of the pads may be changed to meet specific requirements.

It should be understood that the gas bearings may be formed by configurations other than the ramp and flat surface configuration shown. The particular bearing is illustrated for purposes of the description only.

In the preferred embodiment shown in FIG. 1, the pads are spaced so that the applied force F is equally distributed on each pad. As a result, each pad must develop approximately one-third of the counteracting force to support the transducers. The force on the disk is, therefore, equally distributed and less force is required to press the support downward than would be required if the entire surface of the support adjacent to the disk surface were used as the gas bearing surface.

In the presence of deviations of the disk surface, the flexibility of the springs and the pivoting freedom provided by the alignment bearings permits the support to follow the shape of the disk with negligible change in the spacing of the individual pads from the disk surface.

Referring now to FIG. 2, wherein is shown a second embodiment of interconnected pads 40, 41 and 42, forming transducer support 43 having a square configuration. Cones 47 and 49 mate with tips 48 and 50 to form bearing support. Inasmuch as the support is relatively square, it includes parallel surfaces 44 and 45 to which additional transducers may be mounted. For example, transducers could be mounted at each end of the parallel edges to form short recirculating loops (one or a few words) between the transducers and the track of the recording surface underneath. In other embodiments, transducers could be mounted in the center of the support and at other locations in and about the support to form other types of circulating loops or for other purposes. In other respects, the FIG. 2 embodiment is identical to the FIG. 1 embodiment.

Although the invention has been described and illustrated in detail, it is to be understood that the same is by way of illustration and example only, and is not to be taken by way of limitation; the spirit and scope of this invention being limited only by the terms of the appended claims.

We claim:
1. A hydrostatic bearing support for maintaining a separation between transducers mounted on said support and a relatively moving recording surface comprising, at least three non-colinear rigidly interconnected gas bearing pad members for developing a gaseous flow between said members and said surface for maintaining a required separation between said transducers and said surface, transducer positioning means, means interconnecting said positioning means and said bearing members for forcing said members towards said moving recording surface, including means for enabling rotation of said bearing pad members about axes parallel to said recording surface for permitting the alignment of said bearing pad members with respect to deviations occurring in said recording surface, said means interconnecting further including means for applying a force equivalent to the sum of the bearing pressures of said bearing pad members substantially at the centroid of said pressures.

2. The combination recited in claim 1 further including transducers mounted along one side of said support adjacent to a recording track of said recording surface, said transducers being separated along said side for forming a recirculating loop for data on said track.

References Cited

UNITED STATES PATENTS

| | | | |
|---|---|---|---|
| 3,373,413 | 3/1968 | Treseder | 179—100.2 |
| 3,349,384 | 10/1967 | Kohn | 179—100.2 |
| 3,320,599 | 5/1967 | Billawala | 179—100.2 |
| 3,192,514 | 6/1965 | Baillif | 179—100.2 |
| 3,056,962 | 10/1962 | Johnson | 179—100.2 |
| 2,969,435 | 1/1961 | Lynott | 179—100.2 |

BERNARD KONICK, Primary Examiner

J. ROSENBLATT, Assistant Examiner

U.S. Cl. X.R.

179—100.2